United States Patent
Ryu et al.

(10) Patent No.: US 11,677,568 B2
(45) Date of Patent: Jun. 13, 2023

(54) METHOD FOR COLLECTING AND MANAGING EVENT DATA OF A VEHICLE

(71) Applicants: Hyundai Motor Company, Seoul (KR); Kia Motors Corporation, Seoul (KR)

(72) Inventors: Jung Hei Ryu, Hwaseong-si (KR); Seung Wook Park, Yongin-si (KR); Wha Pyeong Lim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 622 days.

(21) Appl. No.: 16/738,183

(22) Filed: Jan. 9, 2020

(65) Prior Publication Data

US 2020/0220737 A1   Jul. 9, 2020

(30) Foreign Application Priority Data

Jan. 9, 2019   (KR) .......................... 10-2019-0002568

(51) Int. Cl.
| | |
|---|---|
| H04L 29/06 | (2006.01) |
| H04L 9/32 | (2006.01) |
| G06F 16/22 | (2019.01) |
| G06F 16/29 | (2019.01) |
| B60R 11/00 | (2006.01) |
| B60R 21/013 | (2006.01) |

(52) U.S. Cl.
CPC ............ *H04L 9/3268* (2013.01); *B60R 11/00* (2013.01); *B60R 21/013* (2013.01); *G06F 16/22* (2019.01); *G06F 16/29* (2019.01)

(58) Field of Classification Search
CPC ......... G06F 16/29; G06F 16/22; B60R 11/00; B60R 21/013; H04L 9/3268; G06Q 10/00
See application file for complete search history.

(56) References Cited

U.S. PATENT DOCUMENTS

| | | |
|---|---|---|
| 2007/0271105 A1 | 11/2007 | Gunderson et al. |
| 2015/0179002 A1 | 6/2015 | Liao et al. |
| 2016/0147945 A1 | 5/2016 | MacCarthy et al. |
| 2017/0187994 A1* | 6/2017 | Tatourian ............... H04N 7/185 |
| 2018/0026949 A1 | 1/2018 | Kimn et al. |
| 2019/0245831 A1* | 8/2019 | Petit .................... H04L 63/0823 |

FOREIGN PATENT DOCUMENTS

| | | | |
|---|---|---|---|
| CN | 107396285 A | | 11/2017 |
| CN | 111200495 A | * | 5/2020 |
| DE | 102015219517 A1 | | 4/2017 |
| KR | 101532024 B1 | | 6/2015 |

\* cited by examiner

*Primary Examiner* — Tri M Tran
(74) *Attorney, Agent, or Firm* — Slater Matsil, LLP

(57) ABSTRACT

A method for collecting and managing event data of a vehicle can be performed by one or more computing systems. The method includes acquiring event data generated by an event data recorder mounted on a vehicle and a first certificate assigned to the vehicle, associating the event data with the first certificate, storing the event data in a first database, acquiring the first certificate and a second certificate assigned to the vehicle, associating the first certificate with the second certificate, and storing the first certificate in a second database.

16 Claims, 6 Drawing Sheets

METHOD FOR COLLECTING AND MANAGING EVENT DATA OF A VEHICLE

CROSS-REFERENCE TO RELATED APPLICATIONS

This application claims priority to Korean Patent Application No. 10-2019-0002568, filed on Jan. 9, 2019, which application is hereby incorporated herein by reference.

This application is related to U.S. Patent Application Ser. No. 16/738,209 (published as US 2020/0218729), which claims priority to Korean Patent Application No. 10-2019-0002567, filed on Jan. 9, 2019. The Korean patent application is incorporated herein by reference.

TECHNICAL FIELD

Embodiments relate to a method and system for collecting and managing event data of a vehicle.

BACKGROUND

The statements in this section merely provide background information related to the present disclosure and may not constitute prior art.

In general, an event data recorder (EDR) is configured to detect an accident or the like and store information about a driving state of a vehicle or an operation by a driver within a predetermined period from a time before the corresponding time to a time after the corresponding time. At least several parameters, including speed, seat belt status and airbag inflation status, are stored such that they may be retrieved in a forensic investigation.

The forensic investigation is generally performed by reading data through an OBD-II port or by physically extracting the data memory of the EDR. The data in the EDR may be damaged or altered due to incorrect reading techniques, or may be maliciously manipulated or deleted after being stored. Accordingly, it may be difficult to perfectly ensure integrity of the stored data.

In investigating the situation surrounding a traffic event (e.g., a traffic accident), investigators from government agencies or private organizations, such as insurance companies and car manufacturers, identify and track specific data sources (e.g., vehicles involved in an accident), and then independently collect the information they need from each data source to identify the causes of the accident, defects, exacerbations, and mitigations. Such information may include data in the EDR. Unfortunately, collecting information in this manner may take lots of time and effort. Moreover, some data sources may be unidentified, may be no longer available at the time they are identified, or may have already been deleted. Therefore, there is a need for a system and related method for collecting and storing data that is in an EDR of a vehicle so as to automatically identify a data source having data relating to a traffic event and acquire such data in a timely manner.

SUMMARY

A cloud storage or remote server may be a secure space that may prevent unauthorized access and prevent data corruption. That is, in order to maintain the integrity of the EDR data, it may be considered to store the EDR data in a reliable cloud storage. However, to store EDR data in the cloud storage, measures to protect the privacy of individuals needs to be considered as well. In this context, the present disclosure proposes a cloud-based EDR data management system that may protect the privacy of individuals.

Embodiments relate to a method and system for collecting and managing event data of a vehicle or multiple vehicles. Embodiments can relate to a method and system for managing EDR data in a cloud-based manner.

In accordance with one aspect of the present invention, a method for collecting and managing event data of a vehicle is performed by one or more computing systems. The method includes acquiring event data recorded by an event data recorder equipped in a vehicle and a first certificate assigned to the vehicle, associating the event data with the first certificate and storing the event data in a first database, acquiring the first certificate and a second certificate assigned to the vehicle, and associating the first certificate with the second certificate and storing the first certificate in a second database.

Embodiments of the method may further include one or more of the following features.

In some embodiments, the first certificate may be one of a plurality of short-term certificates assigned to the vehicle, and the second certificate may be a long-term certificate assigned to the vehicle. Unlike the long-term certificate, the short term certificates do not contain information that may be easily associated with the vehicle (or an owner thereof).

In some embodiments, the method may further include verifying validity of the first certificate before storing the event data in the first database.

In some embodiments, the method may further include verifying validity of the second certificate before storing the first certificate in the second database.

In some embodiments, the acquiring of the event data may include receiving a first message from the vehicle, the first message containing a geographical location of the event, the event data, and the first certificate. The first message may further contain an electronic signature generated using a private key related to the first certificate for the event data and the geographical location.

In some embodiments, the first database and the second database may be managed by different service providers.

In accordance with another aspect of the present disclosure, a method for collecting and managing event data of a vehicle is performed by one or more computing systems. The method includes acquiring event data recorded by an event data recorder equipped in a vehicle, and a first certificate and a second certificate assigned to the vehicle, associating the event data with the first certificate and storing the event data in a first database, and associating the first certificate with the second certificate and storing the first certificate in a second database.

In accordance with another aspect of the present disclosure, a system can be used for collecting and managing event data of a vehicle. The system includes a first database, a first database server configured to manage the first database, a second database, and a second database server configured to manage the second database. The first database server is configured to receive event data recorded by an event data recorder equipped in a vehicle and a first certificate assigned to the vehicle and associate the event data with the first certificate and store the event data in a first database. The second database server is configured to receive the first certificate and a second certificate assigned to the vehicle and to associate the first certificate with the second certificate and store the first certificate in the second database.

Embodiments of the system may further include one or more of the following features.

In some embodiments, the first certificate may be one of a plurality of short-term certificates assigned to the vehicle, and the second certificate may be a long-term certificate assigned to the vehicle.

In some embodiments, the first database server may be configured to verify validity of the first certificate before storing the event data in the first database.

In some embodiments, the second database server may be configured to verify validity of the second certificate before storing the first certificate in the second database.

In some embodiments, the first database server may be configured to receive a first message from the vehicle, the first message containing the first certificate, the event data, and a geographical location of the event. The message may further contain an electronic signature generated using a private key related to the short-term certificate for the event data and the geographical location.

In some embodiments, the first database and the second database may be managed by different service providers.

In some embodiments, the system may further include a data acquisition server communicatively coupled to the first database server and the second database server. The data acquisition server may be configured to acquire the event data, the short-term certificate, and the long-term certificate from the vehicle and distribute the event data, the short-term certificate, and the long-term certificate to the first database server and the second database server.

According to the proposed method and system, data (e.g., EDR data) about an event of interest may be easily obtained in a timely manner by searching a database on a network where event data is stored. In addition, the event data stored in a storage on a reliable network may be useful for forensic investigations where the integrity of event data is required.

Further, according to the proposed method and system, collected event data is stored in a database in association with a short-term certificate (or an identifier extracted therefrom). The short-term certificate does not contain information that may be easily associated with a vehicle (or its owner), and therefore use of a short-term certificate anonymizes the event data in the database. However, the pseudonym certificate is managed in a separate database in association with a long-term certificate that may identify a relevant vehicle such that an authorized person may selectively acquire event data generated by a specific vehicle. No database stores event data and information for identifying the vehicle associated therewith. Thus, protection of privacy may be further enhanced.

DETAILED DESCRIPTION OF ILLUSTRATIVE EMBODIMENTS

Figure 1:
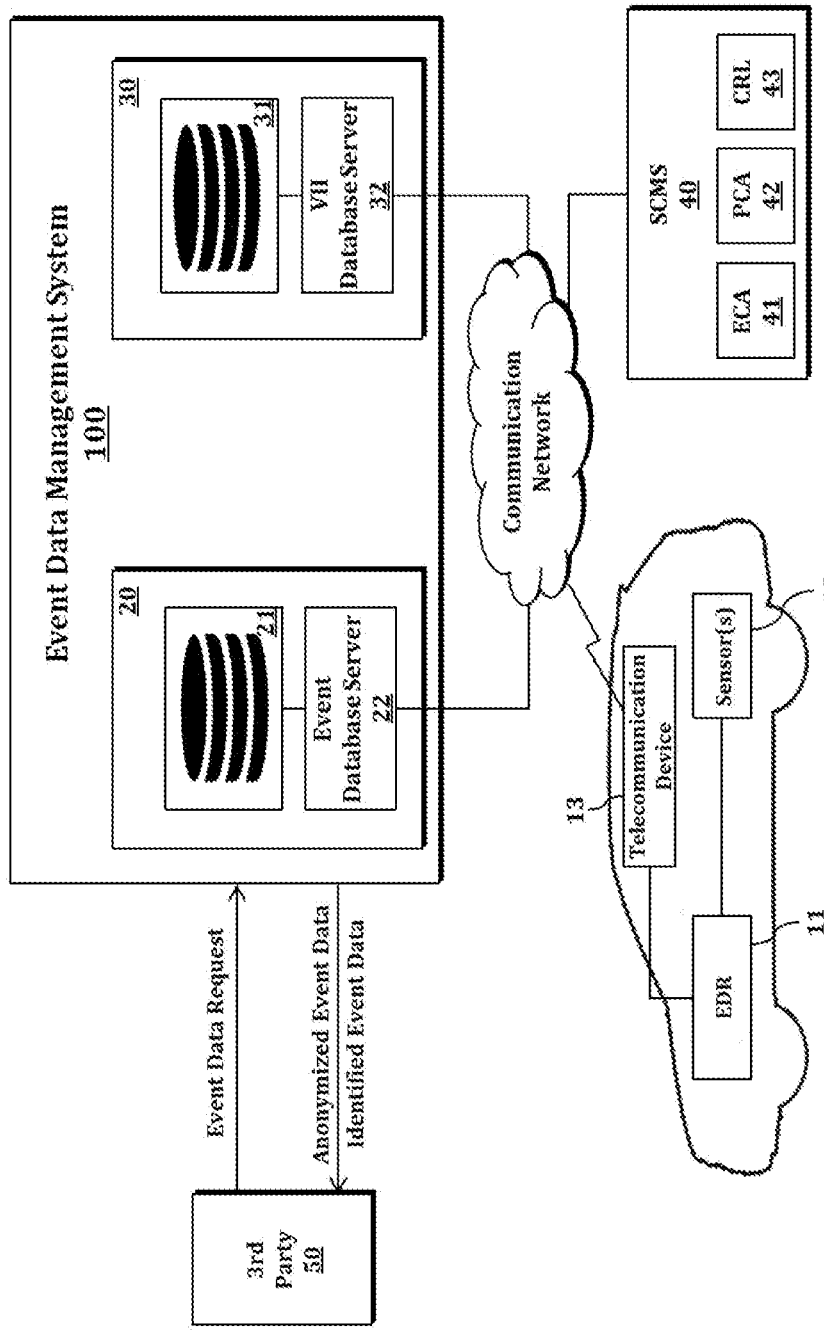
FIG. 1 is a diagram illustrating an entire system for storing and managing event data in a cloud-based manner according to an embodiment of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted when it may make the subject matter of the present disclosure rather unclear.

Additionally, various terms such as first, second, A, B, (a), (b), etc., are used solely for the purpose of differentiating one component from the other but neither imply nor suggest the substances, order or sequence of the components. Throughout this specification, when a part "includes" or "comprises" a component, the part may further include other components, and such other components are not excluded unless there is a particular description contrary thereto. Terms such as "unit," "module," and the like refer to units for processing at least one function or operation, which may be implemented by hardware, software, or a combination thereof.

In order to meet the authentication and privacy requirements in V2X communication, many studies that support Public Key Infrastructure (PKI) have been conducted. One approach of particular interest relies on pseudonym certificates. Unlike conventional certificates, pseudonym certificates do not contain information that may be easily associated with the owner of a vehicle and may only be identified by the pseudonym. A pseudonym is included in the pseudonym certificate as a 'subject identifier'. Thus, the pseudonym certificate may be used to sign messages broadcast to other vehicles without compromising the owner's privacy. Multiple pseudonym certificates are issued for one vehicle, and the issuing authority of the pseudonym certificate does not know the vehicle for which the pseudonym certificates are issued. Due to its short validity period, a pseudonym certificate is also called a short-term certificate. A long-term certificate that has a long validity period associated with the life of the vehicle is provided for situations in which the vehicle should be identified (e.g., verifying the authority to obtain a new pseudonym certificate).

According to at least some embodiments of the disclosure, event data recorded in each vehicle is stored and managed in a database on a network. To protect the privacy of individuals, the collected event data is anonymized with pseudonym certificates (or pseudonyms extracted therefrom). However, the pseudonym certificate is managed in a separate database in association with a long-term certificate for identifying a unique identifier of the vehicle, such that an authorized person may selectively acquire event data generated by a specific vehicle.

FIG. 1 is a diagram illustrating an entire system for storing and managing event data in a cloud-based manner according to an embodiment of the present disclosure.

An on-vehicle monitoring system may record data relating to the driving state of the vehicle, the operation by the driver, and the like within a predetermined period from a time before event occurrence time to a time after the event occurrence time. The on-vehicle monitoring system may wirelessly transmit the recorded data to a cloud-based event data management system 100.

The on-vehicle monitoring system may include an event data recorder (EDR) 11, at least one sensor 12, and a telecommunication device 13, which may be connected to a vehicle data bus (e.g., Controller Area Network (CAN), Local Interconnect Network (LIN), Medium Oriented Systems Transport (MOST), Ethernet, etc.).

The EDR 11 is designed to record and store, when occurrence of one or more predefined events is detected, data within a predetermined period from a time before the detection to a time after the detection. In particular, such an event may be a traffic collision. The traffic collision may be sensed, for example, when inflation of an airbag is triggered. In addition, the event may further include failure of a main function of the vehicle. The failure of the main function may be sensed, for example, when acceleration/deceleration occurs beyond a predefined threshold. The EDR 11 may be accessible to values measured by the at least one sensor 12. The at least one sensor 12 may be designed to sense the vehicle speed/deceleration/travel distance and the like. The data recorded by the EDR 11 may be data suitable for tracking traffic collisions, such as, for example, the dynamics of the vehicle, the driver's behavior, and the operating status of the vehicle safety system. The EDR 11 provides the recorded event data to the telecommunication device 13.

Upon receiving event data from the EDR 11, the telecommunication device 13 may acquire the date, time, and geographic location of occurrence of the event from a positioning device (not shown), a time determination device (not shown), and the like. The positioning device may include a receiver configured to receive geographic location information and/or time information from a satellite assisted positioning system such as GPS or GNSS. The telecommunication device 13 may be configured to include a positioning device and/or a time determination device. Alternatively, the data recorded by the EDR 11 may include the date, time, and geographic location of the triggered event.

The telecommunication device 13 is a wired or wireless telecommunication device that connects an in-vehicle network to an external communication network. The telecommunication device 13 may be, for example, a telematics unit (TMU), or a wired or wireless dongle plugged into the OBD-II port. The telecommunication device 13 may be configured to include a wireless transceiver capable of, for example, cellular communication such as GSM/WCDMA/LTE/5G or short-range wireless communication such as WLAN, c-V2X, WAVE, DSRC, and Bluetooth.

The telecommunication device 13 may hold or access one long-term certificate and multiple short-term certificates used for security of the V2X communication. The telecommunication device 13 may change a short-term certificate to be used, for example, every 5 minutes. As described below, the long-term certificate and the multiple short-term certificates may be an enrollment certificates and multiple pseudonym certificates issued by a Security Credentials Management System (SCMS) 40. In the following description, the terms "pseudonym certificate" and "short-term certificate" may be used interchangeably, and the terms "long-term certificate" and "registration certificate" may be used interchangeably.

Upon receiving the event data from the EDR 11, the telecommunication device 13 may transmit a first message containing the event data and a short-term certificate to an event database server 22 over a communication network. The first message may be anonymized using the short-term certificate. The first message may contain event data signed with a related signature key (i.e., private key) of the short-term certificate, and may further include additional information such as the geographic location, date, time, and the like of occurrence of the event.

The telecommunication device 13 may also transmit a second message containing a long-term certificate and the short-term certificate (used in the first message) to a VII database server 32. The second message may contain a short-term certificate signed with a related signature key (i.e., private key) of the long-term certificate. Alternatively, the telecommunication device 13 may transmit the second message containing the short-term certificate and the long-term certificate before transmitting the first message containing the event data and the short-term certificate.

The event data management system 100 stores and manages event data acquired from multiple vehicles. As mentioned above, in order to protect the privacy of individuals, the acquired event data is anonymized with a short-term certificate (or pseudonym extracted therefrom) and stored in a database. In order to selectively extract event data generated by a specific vehicle, a pseudonym certificate used to identify the event data is managed in a separate database in association with a long-term certificate that enables unique identification of the related vehicle. Event data and information for identifying a vehicle related thereto are not stored together in any database.

In this embodiment, a subsystem 20 for storing event data and a subsystem 30 for storing VII data for identifying a related vehicle are independently implemented in the event data management system 100. The subsystem 20 and 30 may be managed by different operators. These operators may cooperate with each other to provide storage/management/inquiry services for the event data collected from multiple vehicles and to protect privacy. Alternatively, the subsystem 20 and 30 may be managed independently by one operator.

The subsystem 20 for storing event data may include an event database 21 and an event database server 22 configured to manage the event database 21. The subsystem 30 for storing VII data may include a VII database 31 and a VII database server 32 configured to manage the VII database 31. While the event database server 22 and the VII database server 32 are illustrated in FIG. 1 as being distinguished as separate servers, these servers may be implemented by sharing computing resources through well-known virtualization techniques.

The event database server 22 may receive a first message containing event data from multiple vehicles. As described above, the first message may contain a pseudonym certificate, event data, and a location of event occurrence (i.e., a geographic location of the vehicle at the time of event occurrence). The first message may also contain an electronic signature generated using a private key associated with the short-term certificate for the "event data and/or location of event occurrence." The event database server 22 may verify the signature contained in the first message with an associated public key of the short-term certificate. The event database server 22 may store the event data and the event occurrence location in the event database 21 in association with the short-term certificate (or a pseudonym extracted therefrom). That is, in the event database 21, each piece of event data may be identified by one of multiple pseudonyms assigned to a vehicle which is the data source.

The VII database server 32 may receive a second message from multiple vehicles. As described above, the second message may contain a long-term certificate and the short-term certificate used in the first message. The second message may also contain an electronic signature for the short-term certificate generated using an associated private key of the long-term certificate. The VII database server 32 may verify the signature contained in the second message with an associated public key of the long-term certificate. The long-term certificate may be an explicit certificate that includes the associated public key. The VII database server 32 may associate the short-term certificate with the long-term certificate and store the same in the VII database 31. In other words, the VII database 31 may manage the association between a unique identifier of a vehicle (contained in the long-term certificate) and a pseudonym (contained in the short-term certificate) to enable identification of a specific vehicle corresponding to the pseudonym. The unique identifier of the vehicle may be, for example, a vehicle identification number (VIN), a MAC address of a wireless transceiver (included in the telecommunication device), or the like.

The event data management system 100 may be associated with the SCMS 40, which is V2X security infrastructure. The SCMS 40 may include an Enrollment Certificate Authority (Enrollment CA or ECA) 41, a Pseudonym Certificate Authority (Pseudonym CA or PCA) 42, and a CRL management server 43 as functional components thereof.

The ECA 41 is an authority that issues an enrollment certificate associated with a unique identifier of a vehicle. The ECA 41 generates a public key and a private key assigned to the unique identifier of a registered vehicle, and issues a registration certificate, which is a certificate for the public key, to each vehicle. This certificate is a long-term certificate that has a long validity period associated with the life of the vehicle. In addition, the ECA 41 makes a request to the Pseudonym CA for issuance of pseudonyms assigned to the unique identifier of the registered vehicle.

The PCA 42 is an authority that issues a pseudonym certificate. Upon receiving a pseudonym issuance request from the ECA 41, the PCA 42 generates multiple pseudonym certificates for the corresponding unique identifier and issues the same to the vehicle. Here, the pseudonym certificate may include a public key, a validity period of the public key, and a digital signature of the PCA 42. The pseudonym certificates are short-term certificates used for a very short period of time.

The CRL management server 43 is an entity that generates and distributes a Certificate Revocation List (CRL).

Before inputting the event data contained in the first message into the event database 21, the event database server 22 may check the CRL managed by the SCMS to check the validity of the short-term certificate contained in the first message. Upon determining that the short-term certificate is valid, the event database server 22 may input the event data contained in the received first message into the event database 21. Similarly, the VII database server 32 may check the CRL managed by the SCMS 40 to check the validity of the long-term certificate contained in the second message. Upon determining that the long-term certificate is valid as a result of the checking, the VII database server 32 may associate the short-term certificate with the long-term certificate and store the same in the VII database 31. Alternatively, in order to internally check the validity of the short-term and long-term certificates, the event data management system 100 may be configured to include a CRL management module (not shown) configured to separately store and manage a certificate revocation list (CRL) that is periodically distributed by the SCMS 40.

Investigators or researchers from various institutions may make a request to the event data management system 100 for checking of the desired event data. A third party 50 may be a user who wants to utilize anonymized event data or identified event data, for example, an insurance company or a government agency, a researcher, a vehicle manufacturer, a vehicle owner, or the like. In response to a query from the third party 50, the event data management system 100 may cause the event database server 22 and/or the VII database server 32 to extract event data specific to the query of the third party from the event database 21 and/or VII database 31. The query may include at least one parameter related to an investigation range or criterion, such as an event location, an event date, an event time, the model of a vehicle involved, and a VIN.

As an example, upon receiving a request for data about an event that has occurred in a specific area for a certain period of time from government investigators or researchers, the event data management system 100 may cause the event database server 22 to search the event database 21 and extract related event data. Since the event data extracted from the event database 21 are data anonymized with short-term certificates (or pseudonyms extracted therefrom), provision of the extracted event data does not compromise the privacy of the owner of the vehicle involved.

As another example, upon receiving a request for event data related to a specific VIN from an investigator of an insurance company, the event data management system 100 may search the VII database 31 for a long-term certificate corresponding to the VIN via the VII database server 32 and specify a short-term certificate (or a pseudonym extracted therefrom) associated with the long-term certificate. Then, the event data management system 100 may cause the event database server 22 to search the event database 21 to extract event data associated with the specified pseudonym certificate (or pseudonym).

For further protection of the privacy of individuals, the VII database server 32 may further control access to data stored in the VII database 31 based on a preset access authorization policy. For example, the access authorization policy may only allow access by investigators or other users authorized by each vehicle owner unless otherwise authorized by court order, a search warrant and/or other applicable laws and regulations. In other words, the preset authorization policy may provide different levels of access for different users of the VII database 31. On the other hand, the event database server 22 managing the anonymized event database 21 may use a less stringent access authorization policy than the VII database server 32. For example, the event database server 22 may use an access authorization policy that is based only on a billing system for third parties requesting anonymized event data.

In addition, a firewall may be used for the database servers 22 and 32 or database encryption techniques may be applied to the databases 21 and 31. In particular, to ensure secure management of the VII data, advanced security techniques may be adopted for the VII database server 32 and/or the VII database 31.

Figure 2:
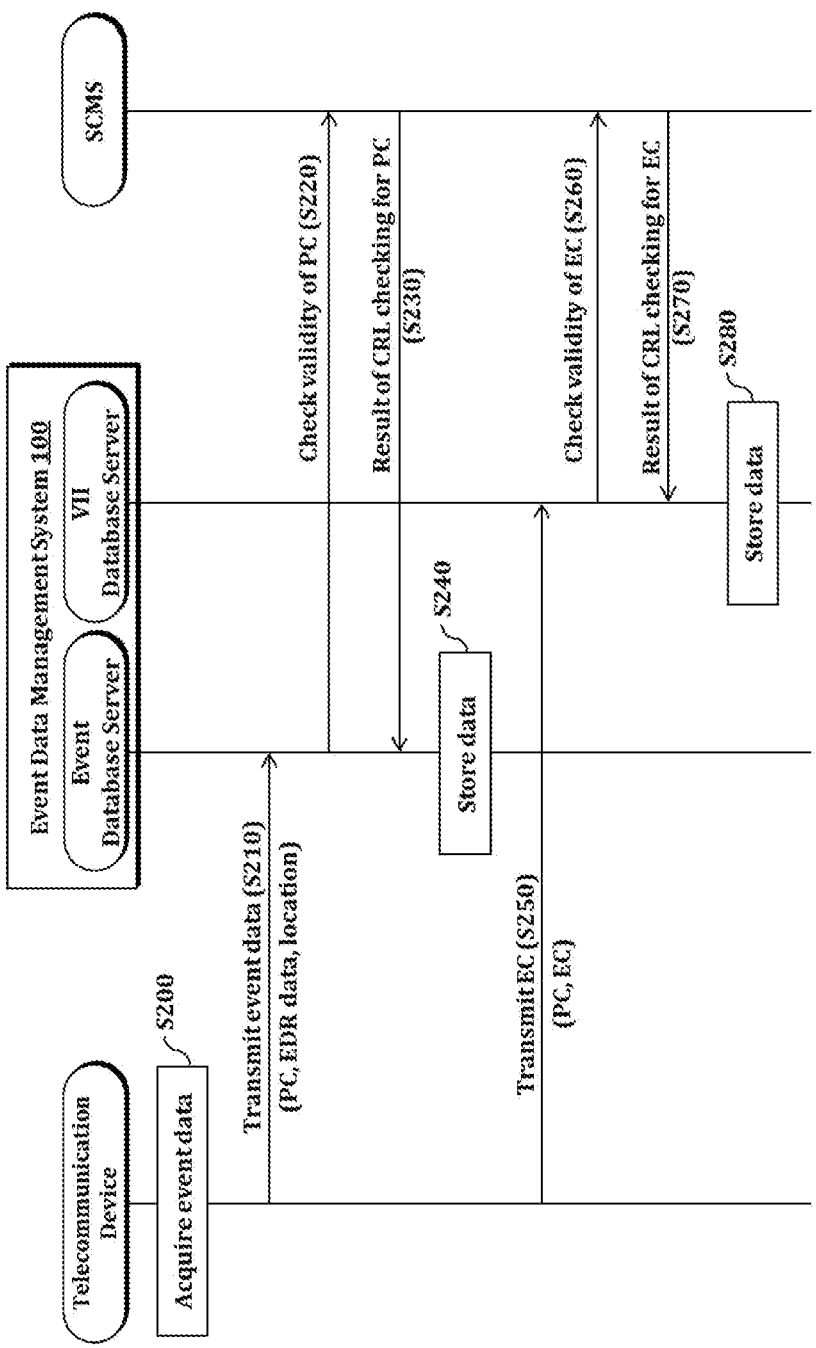
FIG. 2 is a flowchart illustrating an event data collection process of the system shown in FIG. 1.

FIG. 2 is a flowchart illustrating an event data collection process of the system shown in FIG. 1.

First, a vehicle telecommunication device (TMU) 13 acquires vehicle related data from one or more modules, components, and programs including the EDR 11 (S200). For example, the telecommunication device (TMU) may receive event data recorded before and after an event from the EDR 11 and collect information on the geographical location, date, and time of the event, an involved vehicle model, etc.

The telecommunication device (TMU) 13 wirelessly transmits a first message containing the event data and a short-term certificate to the event database server 22 on a network (S210). As described above, the first message may contain a short-term certificate, event data, and a geographic location. In addition, the first message may further contain an electronic signature generated using a private key related to the short-term certificate for the event data and the geographical location.

Upon receiving the first message, the event database server 22 anonymizes the event data contained in the first message and inputs the event data into the event database 21 (S240). For example, the event database server 22 may associate the event data and the geographical location of the event with the short-term certificate of a corresponding vehicle and store the same in the event database 21. The event database server 22 may check the validity of the short-term certificate by querying the SCMS 40 for a CRL before storing the event data (S220 and S230). In some embodiments, operations S220 to S230 for verifying the validity of the short-term certificate PC may be skipped.

The VII database server 32 receives a long-term certificate and the short-term certificate used for the electronic signature of the first message from the vehicle (S250). The VII database server 32 may associate the short-term certificate with the long-term certificate and store the same in the VII database 31 (S280). Before storing the short-term certificate, the VII database server 32 may check the validity of the long-term certificate by querying the SCMS 40 for the CRL (S260 to S270).

Unlike the example illustrated in FIG. 2, operations S210 and S250 may be reversed in order. That is, the telecommunication device 13 may transmit the second message containing the short-term certificate and the long-term certificate before transmitting the first message containing the event data and the short-term certificate.

Figure 3:
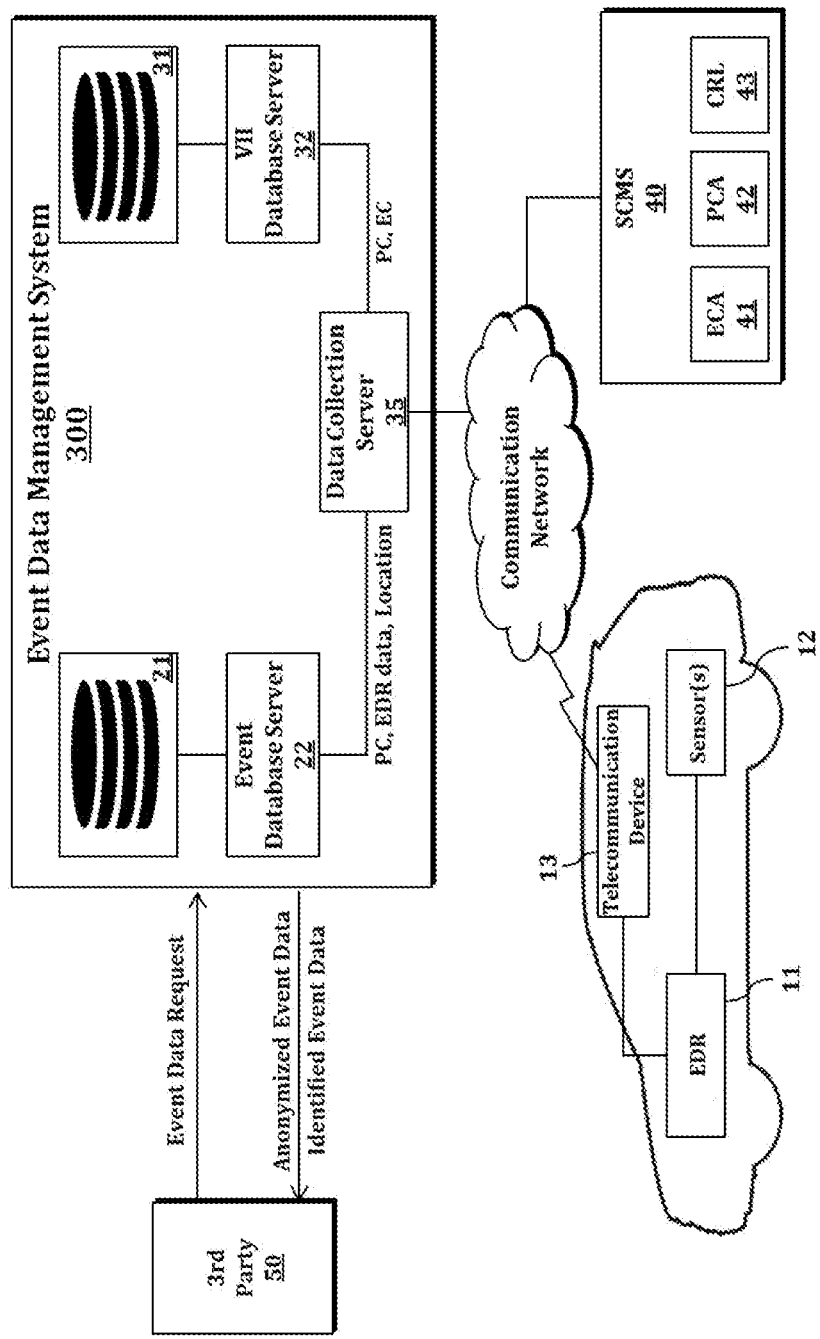
FIG. 3 is a diagram illustrating an entire system for storing and managing event data in a cloud-based manner according to another embodiment of the present disclosure.

FIG. 3 is a diagram illustrating an entire system for storing and managing event data in a cloud-based manner according to another embodiment of the present disclosure.

Compared to the event data management system 100 illustrated in FIG. 1, an event data management system 300 illustrated in FIG. 3 further includes a data collection server 35.

The data collection server 35 may receive, from the telecommunication device 13 of the vehicle, a first message containing event data and a short-term certificate and a second message containing a long-term certificate and a short-term certificate over a communication network. The data collection server 35 may receive the event data, the short-term certificate, and the long-term certificate all at once from the telecommunication device 13 of the vehicle. The data collection server 35 may be configured to deliver the event data and the short-term certificate to the event database server 22 and to deliver the long-term certificate and the short-term certificate to the VII database server 32. That is, the data collection server 35 may perform a message routing function or a message filtering function. Operation of the entire system of FIG. 3 including the data collection server 35 will be described in detail later with reference to FIG. 4.

In the event data management system 300 illustrated in FIG. 3, the servers 22, 32, and 35 may be managed by one operator. The data collection server 35 may be connected to the event database server 22 and the VII database server 32 via an intranet. In this case, the data collection server 35 may further perform a firewall function to protect the internal network from external networks. Alternatively, the servers 22, 32, and 35 may be managed by different operators.

Figure 4:
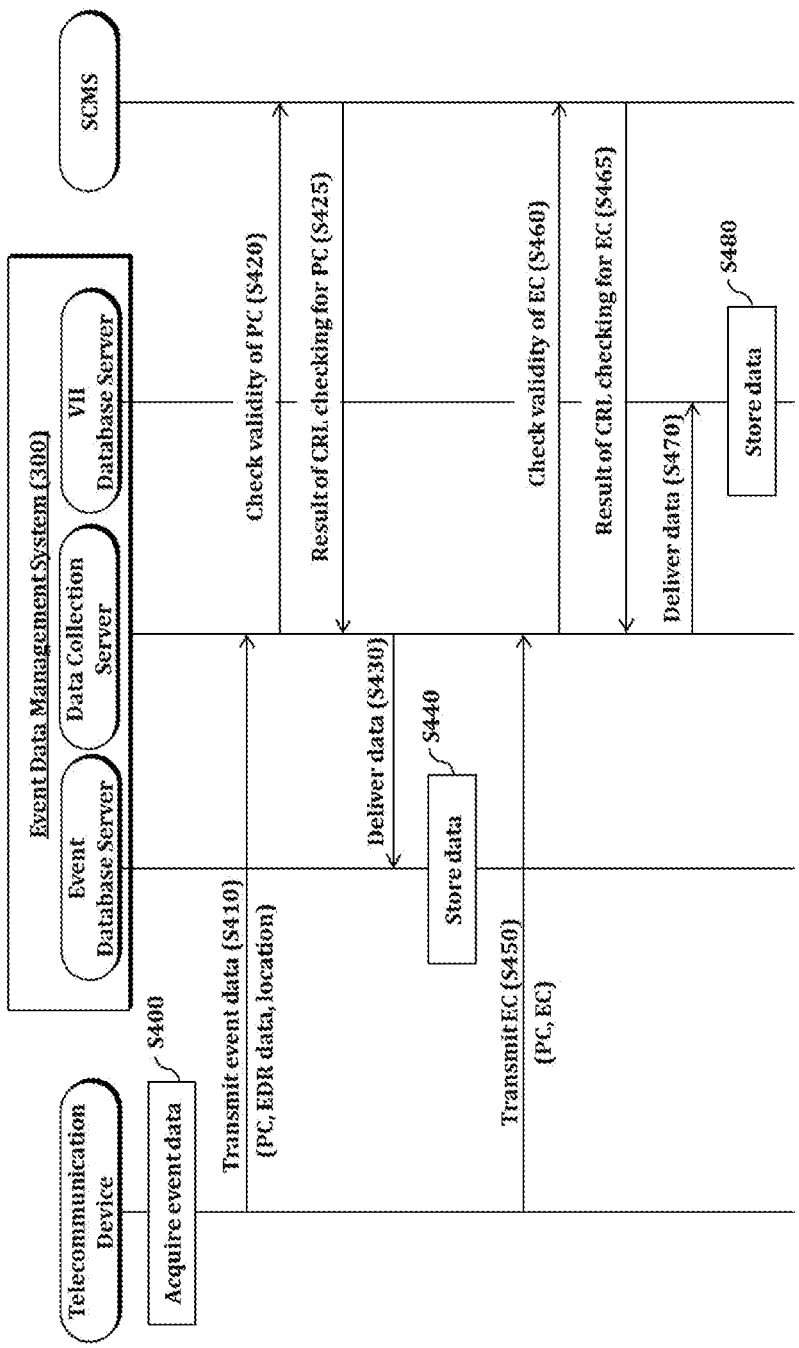
FIG. 4 is a flowchart illustrating an event data collection process of the system shown in FIG. 3.

FIG. 4 is a flowchart illustrating an event data collection process of the system shown in FIG. 3.

First, the vehicle telecommunication device 13 acquires vehicle related data from one or more modules, components, and programs including the EDR 11 (S400). For example, the telecommunication device 13 may receive event data recorded before and after an event from the EDR 11 and collect information on the geographical location, date, and time of the event, an involved vehicle model, etc.

The telecommunication device 13 wirelessly transmits a first message containing the event data and a short-term certificate PC to the data collection server 35 over a network (S410). As mentioned above, the first message may contain a short-term certificate PC, event data, and a geographic location. In addition, the first message may further contain an electronic signature generated using a private key related to the short-term certificate PC for the event data and the geographical location.

Upon receiving the first message, the data collection server 35 may query the SCMS 40 for the CRL and check the validity of the short-term certificate PC (S420 to S425). When the short-term certificate PC is valid, the data collection server 35 delivers the event data, the short-term certificate PC, and the like contained in the first message to the event database server 22 (S430). In some embodiments, operations S420 to S425 for verifying the validity of the short-term certificate PC may be skipped.

The event data server 22 anonymizes the event data and inputs the same into the event database 21 (S440). For example, the event database server 22 may associate the event data and the geographical location of the event with the short-term certificate PC of a corresponding vehicle or the pseudonym extracted from the short-term certificate and store the same in the event database 21.

The telecommunication device 13 transmits a second message containing a long-term certificate EC and the short-term certificate PC used for the first message to the data collection server 35 on the network (S450).

Upon receiving the first message, the data collection server 35 may check the validity of the long-term certificate by querying the SCMS 40 for the CRL (S460 and S465). When the long-term certificate EC is valid, the data collection server 35 delivers the long-term certificate EC and the short-term certificate PC contained in the second message to the VII database server 32 (S470).

The VII database server 32 associates the short-term certificate with the long-term certificate and stores the same in the VII database 31 (S480).

Unlike the example illustrated in FIG. 4, operations S410 and S450 may be reversed in order, or may be performed in one operation. For example, the telecommunication device 13 may transmit the second message containing the short-term certificate and the long-term certificate before transmitting the first message containing the event data and the short-term certificate. The event data, the short-term certificate, and the long-term certificates may be transmitted all at once.

As described above, the third party 50 may perform a query operation on the operator(s) of the event data management system 100, 300 by specifying a plurality of parameters in order to obtain desired EDR data. The query parameters may include at least one parameter related to an investigation range or criterion, such as an event location, an event date, an event time, the model of a vehicle involved, and a VIN. Hereinafter, a process of providing related event data by the system 100, 300 illustrated in FIG. 1 or 3 in response to such a query will be described with reference to FIGS. 5 and 6.

Figure 5:
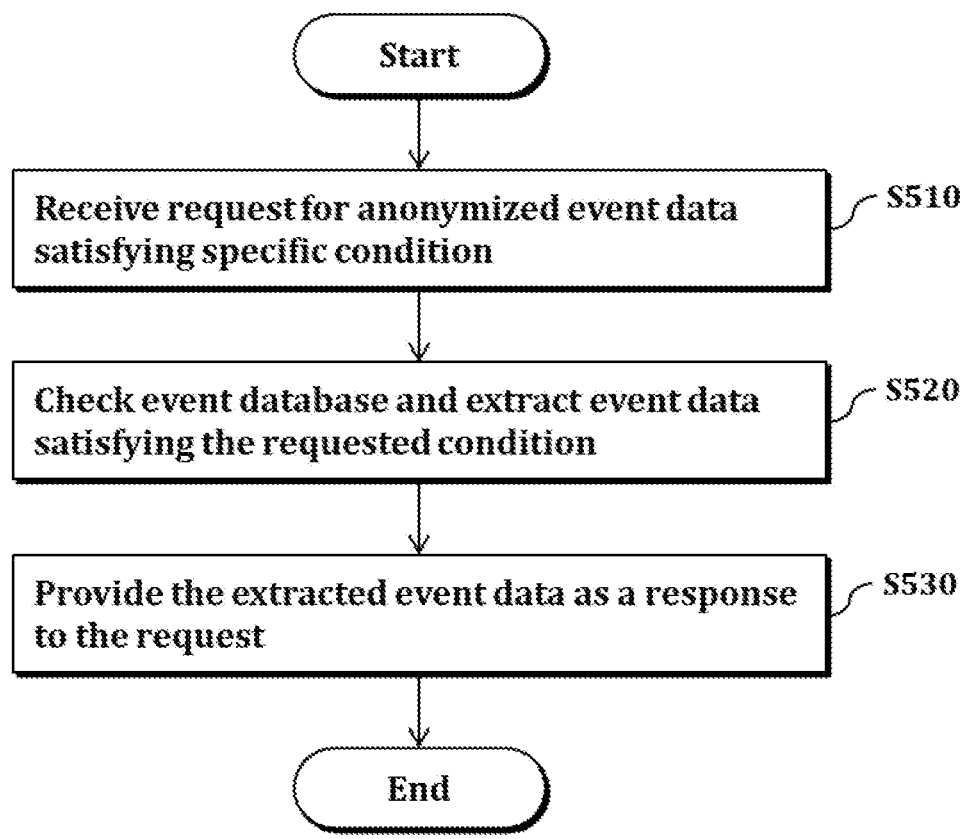
FIG. 5 is a flowchart illustrating a process of providing anonymized event data by the event data management system illustrated in FIG. 1 or 3.

FIG. 5 is a flowchart illustrating a process of providing anonymized event data by the event data management system 100, 300 illustrated in FIG. 1 or 3.

For example, the event data management system 100, 300 may receive a request for anonymized event data that satisfies a specific condition, such as events that occurred in a specific area for a certain period of time, from government agency investigators or researchers (S510). The event data management system 100, 300 may check the event database 21 and extract event data satisfying the requested condition (S520). The event data management system 100, 300 may provide the extracted event data as a response to the request (S530). Since the event data extracted from the event database 21 are data anonymized with pseudonym certificates (or pseudonyms extracted therefrom), the privacy of the vehicle owner (or driver) is not compromised. Moreover, the VII database 31 is not involved in providing the anonymized event data. The event data management system 100, 300 may determine whether the requestor has an access right before or after operation S510.

Figure 6:
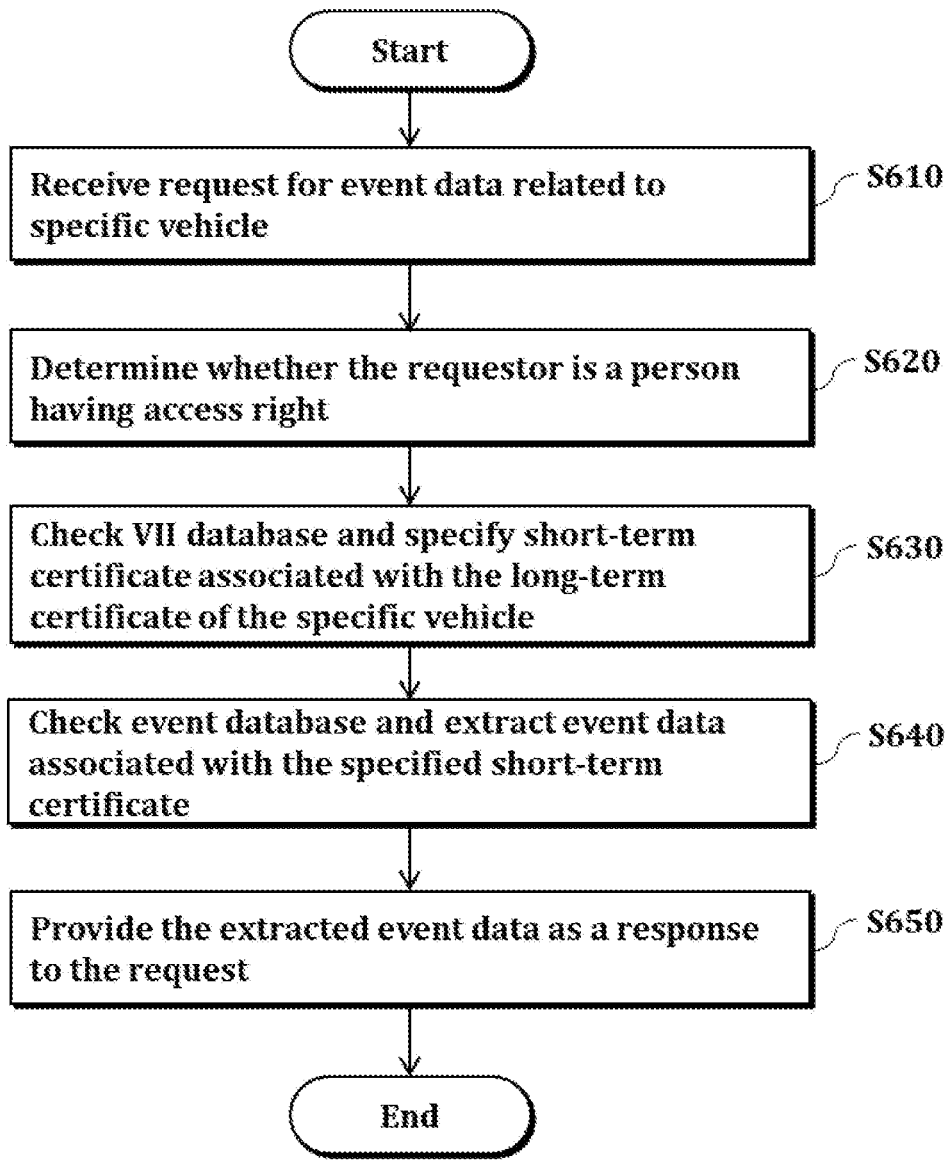
FIG. 6 is a flowchart illustrating a process of providing event data related to a specific vehicle by the event data management system illustrated in FIG. 1 or 3.

FIG. 6 is a flowchart illustrating a process of providing event data related to a specific vehicle by the event data management system 100, 300 illustrated in FIG. 1 or 3.

For example, the event data management system 100, 300 may receive a request for event data related to a specific VIN from a vehicle owner, an insurance company, or an investigator of an investigative agency (S610). The event data management system 100, 300 may determine whether the requestor is a person having access right authorized by a court order, a search warrant and/or other applicable laws and regulations or by a relevant vehicle owner (S620). The event data management system 100, 300 may check the VII database 31 for a long-term certificate corresponding to (assigned to) the VIN and specify a short-term certificate (or pseudonym extracted therefrom) associated with the long-term certificate (S630). Then, the event data management system 100 may check the event database 23 and extract event data corresponding to the specified pseudonym certificate (or pseudonym) (S640). The event data management system 100, 300 may provide the extracted event data as a response to the request (S650). When the event database 23 and the VII database 31 are operated by different operators, the short-term certificate (or pseudonym extracted therefrom) obtained by checking the event database 23 in operation S630 may be provided to the above-mentioned investigators or directly to operators operating for use in checking the VII database 31.

It should be understood that the example embodiments described above may be implemented in many different ways. In some examples, the various methods, apparatuses, servers, and (sub)systems described in this disclosure may be implemented by at least one general purpose computer having a processor, a memory, a disk or other mass storage, a communication interface, input/output (I/O) devices, and other peripherals. The general purpose computer may function as an apparatus to execute the methods described above by loading software instructions into the processor and then executing the instructions to perform the functions described in this disclosure.

The various methods described in this disclosure may be implemented with instructions stored on a non-transitory recording medium that can be read and executed by one or more processors. Non-transitory recording media include, for example, all types of recording devices in which data is stored in a form readable by a computer system. For example, the non-transitory recording media may include storage media such as an erasable programmable read only memory (EPROM), an electrically erasable programmable read-only memory (EPROM), a flash drive, an optical drive, a magnetic hard drive, and a solid state drive (SSD).

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the explicitly described above embodiments but is inclusive of the claims and equivalents thereto.

What is claimed is:

1. A method for collecting and managing event data of a vehicle, performed by one or more computing systems, the method comprising:
   receiving a first message from the vehicle, the first message containing a first certificate and event data, the event data having been recorded by an event data recorder equipped in the vehicle and the first certificate being one of a plurality of short-term certificates assigned to the vehicle;
   anonymizing the event data with a pseudonym extracted from the first certificate;
   storing the anonymized event data in a first database;
   receiving a second message containing the first certificate and a second certificate, the second certificate being a long-term certificate assigned to the vehicle;
   associating the first certificate with the second certificate by associating a unique identifier of the vehicle contained in the second certificate and the pseudonym contained in the first certificate;
   storing the first certificate and the second certificate associated with the first certificate in a second database;
   transmitting the event data and the first certificate to a first database server associated with the first database; and
   transmitting the first certificate and the second certificate to a second database server associated with the second database;
   wherein the first message and the second message are received from the vehicle by an acquisition server and wherein the acquisition server transmits the event data and the first certificate to the first database server and transmits the first certificate and the second certificate to the second database server, wherein the first database and the second database are managed by different service providers.

2. The method of claim 1, further comprising verifying validity of the first certificate before storing the event data in the first database.

3. The method of claim 1, further comprising verifying validity of the second certificate before storing the first certificate in the second database.

4. The method of claim 2, wherein the first message further contains a geographical location of an event associated with the event data and an electronic signature generated using a private key related to the first certificate for the event data and the geographical location.

5. The method of claim 2, further comprising verifying validity of the second certificate before storing the first certificate in the second database.

6. A system for collecting and managing event data of a vehicle, the system comprising a plurality of physical computing devices including:
   a first database;
   a first database server configured to manage the first database;

a second database, wherein the first database and the second database are managed by different service providers; and a second database server configured to manage the second database;

wherein the first database server is configured to:
  receive a first message from the vehicle via an acquisition server, the first message containing a first certificate and event data, the event data having been recorded by an event data recorder equipped in the vehicle and the first certificate being one of a plurality of short-term certificates assigned to the vehicle;
  anonymize the event data with a pseudonym extracted from the first certificate; and
  store the anonymized event data in the first database; and wherein the second database server is configured to:
  receive a second message containing the first certificate and a second certificate from the acquisition server, the second certificate being a long-term certificate assigned to the vehicle;
  associate the first certificate with the second certificate by associating a unique identifier of the vehicle contained in the second certificate and the pseudonym contained in the first certificate; and
  store the first certificate and the second certificate associated with the first certificate in the second database.

7. The system of claim 6, wherein the first database server is further configured to verify validity of the first certificate before storing the event data in the first database.

8. The system of claim 6, wherein the second database server is further configured to verify validity of the second certificate before storing the first certificate in the second database.

9. The system of claim 6, wherein the first database server is configured to receive a geographical location of an event associated with the event data.

10. The system of claim 9, wherein the first message further contains an electronic signature generated using a private key related to the first certificate for the event data and the geographical location.

11. The system of claim 6, further comprising the acquisition server communicatively coupled to the first database server and the second database server, wherein the acquisition server is configured to:

acquire the event data, the first certificate, and the second certificate from the vehicle;
  transmit the event data and the first certificate to the first database server; and
  transmit the first certificate and the second certificate to the second database server.

12. A method for collecting and managing event data of a vehicle, performed by one or more computing systems, the method comprising:
  receiving a first message from the vehicle via an acquisition server, the first message containing a first certificate, event data, and a geographical location of an event associated with the event data, the event data having been recorded by an event data recorder equipped in the vehicle and the first certificate being one of a plurality of short-term certificates assigned to the vehicle;
  anonymizing the event data with a pseudonym extracted from the first certificate;
  storing the anonymized event data in a first database;
  receiving a second message containing the first certificate and a second certificate from the acquisition server, the second certificate being a long-term certificate assigned to the vehicle;
  associating the first certificate with the second certificate by associating a unique identifier of the vehicle contained in the second certificate and the pseudonym contained in the first certificate; and
  storing the first certificate and the second certificate associated with the first certificate in a second database, wherein the first database and the second database are managed by different service providers.

13. The method of claim 12, further comprising verifying validity of the first certificate before storing the event data in the first database.

14. The method of claim 13, further comprising verifying validity of the second certificate before storing the first certificate in the second database.

15. The method of claim 12, further comprising verifying validity of the second certificate before storing the first certificate in the second database.

16. The method of claim 12, wherein the first message further contains an electronic signature generated using a private key related to the first certificate for the event data and the geographical location.

* * * * *